United States Patent [19]
Fant

[11] Patent Number: 4,753,700
[45] Date of Patent: Jun. 28, 1988

[54] PACKAGING FILM

[75] Inventor: Ennis M. Fant, Greenville, S.C.

[73] Assignee: W. R. Grace & Co., Cryovac Div., Duncan, S.C.

[21] Appl. No.: 938,945

[22] Filed: Dec. 8, 1986

Related U.S. Application Data

[62] Division of Ser. No. 834,694, Feb. 28, 1986.

[51] Int. Cl.$^4$ ............................................. B29F 3/04
[52] U.S. Cl. ............................. 264/514; 156/244.11; 156/309.9; 264/171; 264/173; 264/515; 264/512; 264/176.1
[58] Field of Search .................. 156/244.11, 309.9; 264/514, 171, 173, 515, 512, 176.1

[56] References Cited

U.S. PATENT DOCUMENTS

| | | | |
|---|---|---|---|
| 4,095,012 | 6/1978 | Schirmer | 428/474 |
| 4,117,193 | 9/1978 | Tsuchiya et al. | 428/38 |
| 4,182,457 | 1/1980 | Yamada et al. | 215/1 |
| 4,284,674 | 10/1981 | Sheptak | 428/349 |
| 4,355,721 | 10/1982 | Knott, II | 428/35 |
| 4,398,635 | 8/1983 | Hirt | 206/532 |
| 4,405,667 | 9/1983 | Christensen et al. | 428/35 |
| 4,407,873 | 10/1983 | Christensen et al. | 428/35 |
| 4,412,025 | 10/1983 | Corwin et al. | 524/241 |
| 4,436,778 | 3/1984 | Dugal | 428/36 |
| 4,457,960 | 7/1984 | Newsome | 428/35 |
| 4,495,249 | 1/1985 | Ohya et al. | 428/516 |
| 4,501,798 | 2/1985 | Koschak et al. | 428/349 |
| 4,514,465 | 4/1985 | Schoenberg | 428/339 |
| 4,522,775 | 6/1985 | Briggs et al. | 264/173 |
| 4,533,510 | 8/1985 | Nissel | 264/171 |
| 4,551,365 | 11/1985 | Bonis | 428/35 |
| 4,561,920 | 12/1985 | Foster | 156/244.11 |
| 4,572,854 | 2/1986 | Dallmann | 156/244.11 |
| 4,588,648 | 5/1986 | Krueger et al. | 428/475.8 |
| 4,612,221 | 9/1986 | Biel et al. | 428/35 |
| 4,615,922 | 10/1986 | Newsome | 428/35 |
| 4,649,004 | 3/1987 | Nohara et al. | 264/85 |
| 4,692,351 | 9/1987 | Johnston et al. | 428/35 |

FOREIGN PATENT DOCUMENTS

| | | |
|---|---|---|
| 0064333 | 5/1976 | Japan. |
| 0106964 | 5/1982 | Japan. |
| 242054 | 5/1983 | Japan. |
| 0215864 | 5/1983 | Japan. |
| 0184829 | 3/1984 | Japan. |
| 0027252 | 7/1984 | Japan. |

*Primary Examiner*—Edith Buffalow
*Attorney, Agent, or Firm*—John J. Toney; William D. Lee, Jr.; Mark B. Quatt

[57] ABSTRACT

A multilayer film useful in the packaging of high acid food products at elevated temperatures comprises a core layer of ethylene vinyl alcohol copolymer, two intermediate layers each comprising a polyamide; outer blend layers of linear low density polyethylene and anti-blocking agent, and adhesive polymeric materials to adhere the outer blend layers to the respective intermediate polyamide layers.

5 Claims, 1 Drawing Sheet

PACKAGING FILM

This is a divisional application of application Ser. No. 834,694, filed on Feb. 28, 1986.

BACKGROUND OF THE INVENTION

This invention relates generally to the art of packaging films and more paticularly to films useful in the packaging of food products.

It is common practice in packaging many goods, including food items, to use what is generally known as form-fill-seal equipment. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art and the end of the tube is sealed together by a pair of transverse heat seals which are vertically spaced apart. At this point the tube is filled with a measured quantity of the product to be packaged. A second heat sealing operation, typically performed after the filled tube has been downwardly advanced, completes enclosure of the product. Simultaneously with or shortly after the transverse heat sealing step the tube is completely transversely severed by known cutting means in a space between the vertically spaced apart pair of transverse heat seals. Thereafter the tube is downwardly advanced and the cycle is successively repeated so as to form a multiplicity of individually packaged products.

Alternatively, a single transverse heat seal including a pair of horizontally spaced apart sealing jaws may be used to form in effect two vertically adjacent heat seals which are simultaneously or subsequently severed at a line vertically intermediate the heat seals.

Flexible packaging material useful for this as well as other applications typically must meet stringent requirements imposed by the particular food or other article to be packaged. In some cases, for example in high acid foods such as tomato paste and other tomato products, the package must be capable of adequately protecting the food item after packaging and through the distribution cycle until the packaged product reaches the end user at point of sale.

Additionally, products such as those described above are sometimes introduced into the formed tube at relatively high temperatures of about 200° F. The formed package must be able to withstand the still relatively high temperatures of the food product immediately after packaging, and subsequent cooling operations to bring the package to room temperature or other desired temperature range.

The flexible material must also have sufficient abuse resistance to physical and mechanical abuse imposed by the entire form-fill-seal or other packaging system, and the subsequent abuse which the package may undergo during the distribution cycle.

Yet another requirement of packaging material, especially in form-fill-seal systems, is good heat sealability with respect to the transverse heat seals, which are typically subjected to loading forces from the introduced product such as food product, soon after the heat seal is formed.

Of interest in U.S. Pat. No. 4,284,674 issued to Sheptak and disclosing a multilayer film having a core layer of ethylene vinyl alcohol copolymer adhered on each side to nylon, each nylon layer in turn being adhered to a chemically modified polyolefin, and a further layer of primer material suitable to adher the modified polyolefin to an outer layer of polypropylene or other materials suitable for conveying toughness, flex-crack resistance and moisture barrier properties to the multi-ply film.

Also of interest is U.S. Pat. No. 4,355,721 issued to Knott et al and disclosing a coextruded multilayer sheet having a first layer of nylon, an EVOH barrier layer, another layer of nylon, an adhesive layer, and another outside layer of, for example, high density polyethylene.

Of interest is U.S. Pat. No. 4,398,635 issued to Hirt and disclosing a medication package in which a coextruded multiple layer sheet may have a structure including a layer of ethylene vinyl alcohol copolymer sandwiched between adjacent layers of nylon, and in which one of the nylon layers may be further adhered to a tie resin. The nylon layers may form either an outside surface or, in one example, internal layers with additional layers of polymeric materials added to each side of the sandwich structure.

Of interest is U.S. Pat. No. 4,407,873 issued to Christensen et al, disclosing a packaging material for retort applications including a heat seal layer of linear low density polyethylene, a second layer of linear low density polyethylene with optionally 0% to 80% medium density polyethylene blended into the second layer, a third layer of anhydride modified medium density polyethylene, a fourth layer of nylon, a fifth layer of ethylene vinyl alcohol copolymer, and a sixth layer of nylon.

Of interest is U.S. Pat. No. 4,457,960 issued to Newsome, disclosing a multilayer film having a core layer of a barrier material such as EVOH and EVOH blends. This film may be shrinkable and may be melt extruded, and may contain outside layers having a blend of linear low density polyethylene and ethylene vinyl acetate copolymer.

Of interest is U.S. Pat. No. 4,495,249 issued to Ohya et al, disclosing a five-layer film having a core layer of a saponified copolymer of ethylene and vinyl acetate, outer layers of a mixture of linear low density polyethylene and ethylene vinyl acetate copolymer, and two adhesive layers disposed between the core layer and outer layers.

It is an object of the present invention to provide a multilayer film suitable for the packaging of food products, especially high acid content food products at relatively high temperature.

It is a further object of the present invention to provide a multilayer film useful in connection with form-fill-seal processes especially vertical form-fill-seal processes.

It is still another object of the present invention to provide a multilayer film which provides extended shelf life to food products such as high acid content food products.

It is yet another object of the present invention to provide a multilayer film which can be made into a package for food products which can be reheated in building water without delamination or breakage.

One particularly useful feature of this package is its usefulness in packaging food products currently packaged in metal packaging such as No. 10 metal cans. These cans tend to be expensive, bulky during shipment and, after use of the contained food product, difficult to dispose of. Utilizing the multilayer film of the present invention, many food products now packaged in the No. 10 can be conveniently and quickly packaged, stored, shipped, marketed, and sold to the end user such as a commercial or institutional user or a consumer. After use, the emptied package made from the multilayer film provides a much less bulky package for disposal.

SUMMARY OF THE INVENTION

In accordance with the present invention, a multilayer film comprises a core layer comprising an ethylene vinyl alcohol copolymer; two intermediate layers each comprising a polyamide; two surface layers each comprising a blend of a linear low density polyethylene and an anti-blocking agent; and each of said intermediate layers adhered to a respective surface layer of adhesive polymeric material.

In another aspect of the present invention, a method of making a seven-layer film comprises feeding an ethylene vinyl alcohol melt through a first extruder to a coextrusion die; feeding a polyamide melt through a second extruder to the coextrusion die; feeding a melt of an adhesive polymeric material through a third extruder to the coextrusion die; feeding a blend of linear low density polyethylene and an anti-blocking agent, as a melt, through fourth and fifth extruders to the coextrusion die; extruding the seven layer film from the coextrusion die; cooling the coextruded film; collapsing the cooled film; and gathering the collapsed film on a take-up means.

DEFINITIONS

The terms "linear low density polyethylene", "LLDPE", and the like are used herein to refer to copolymers of ethylene with one or more comonomers selected from $C_4$ to $C_{10}$ alphaolefins such as butene-1, octene, etc. in which the molecules of the copolymers comprise long chains with few side chain branches or cross-linked structures. This molecular structure is to be contrasted with conventional low or medium density polyethylenes which are more highly branched than their respective counterparts. "LLDPE" as defined herein has a density usually in the range of from about 0.916 grams cubic centimeter to about 0.925 grams per cubic centimeter.

The term "polyamide" refers to high molecular weight polymers having amide linkages along the molecular chain, and refers more specifically to synthetic polyamide such as various nylons.

The terms "intermediate layer", "interior layer", and the like are used herein to define a layer in a multilayer film bounded on both sides by other layers.

The terms "anti-blocking agent" and the like are used herein to describe substances that reduce the tendency of films or sheets of polyolefin film to stick or adhere to each other or to other surfaces when such adhesion is otherwise undesirable. Typical chemicals such as colloidal silica, finely divided silica, clays, silicons, and certain amides and amines are useful in this application.

BRIEF DESCRIPTION OF THE DRAWINGS

Details of the present invention are provided by reference to the sole drawing figure where.

DESCRIPTION OF THE PREFERRED EMBODIMENTS

Figure 1:
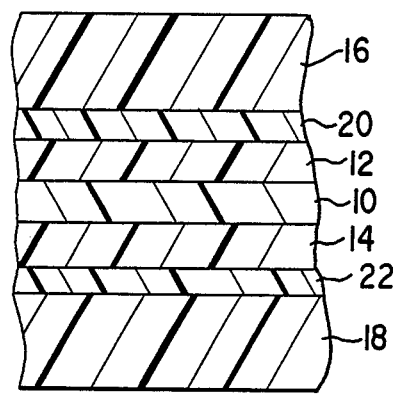
FIG. 1 represents a schematic cross-section of a preferred embodiment of a multilayer film of the invention.

The film structure depicted in FIG. 1 is directed to a multilayer film which is preferably palindromic or symmetrical in construction. A film structure is directed to a multilayer film having the generalized structure of A/B/C/D/C/B/A where A is an outer layer, B is an adhesive layer, C is an intermediate layer, and D is a barrier core layer. Preferably, the outer layers A each comprise about 26% of the total multilayer film thickness; the adhesive layers B each comprise about 8% of the total film thickness; the intermediate layers C each comprise about 11% of the total film thickness; and the barrier core layer D comprises about 10% of the total film thickness. The multilayer film of the present invention is preferably about 5 mils thick.

Preferably, core layer 10 is an ethylene vinyl alcohol copolymer having an ethylene content of preferably 32%. Commercially available resins suitable for the core layer included EVAL EC-F101 (EVALCA), Nippon Goshei Soarnol D, DT, and ZL, and Solvay Clarene R. Ethylene content for the EVOH is preferably between about 20% and 40%, and more preferably between about 25% and 35%. An ethylene content of about 32% by weight is most preferred.

Intermediate layers 12 and 14 are polyamides such as nylon 6. Various nylons are suitable in connection with the present invention including high viscosity versions and nylon copolymers. The polyamide of the intermediate layers 12 and 14 adds strength to the resulting multilayer film structure.

Outer layers 16 and 18 comprise a linear low density polyethylene blended with an anti-blocking agent. This blend contributes pliability to the resulting film, and has the quality of permitting heat sealing of the film even in the presence of contamination in the sealing area of the film. Several anti-blocking agents are available for use in connection with the outer blend layers 16 and 18. Particularly useful are micron-sized silica such as that available from Teknor Apex. This silica is available under the trade designation EPE-8160. Also commercially available is Syloid available from W. R. Grace & Co. A very suitable linear low density polyethylene is Dowlex 2035 available from Dow Chemical Company.

The anti-blocking agent of the outer layers (and of the third and fourth interior blend layers of nine layer embodiments), is necessary to prevent the multilayer film from sticking to the forming mandrel during a form-fill-seal operation, with the detrimental effect on filling operations which this would cause. A preferred range of the anti-blocking agent is from about 1% to about 15% by weight of the blend layers. A more preferred range is from about 5% to about 10%. Inadequate anti-blocking agent i.e. below 1%, will result in the film sticking to the forming mandrel or shoe as it is formed, and the film material will not machine well on form-fill-seal equipment. A content above 15% could result in a progressive decrease in seal strength.

Adhesive layers 20 and 22 may comprise various polymeric adhesives, especially modified polymeric adhesives such as Plexar 2581 available from Norchem. This particular adhesive is a LLDPE-based modified adhesive. LLDPE-based adhesives are preferred as adhesive materials in the present film. Adhesives based on other polyolefins can be used, but less effectively.

A method for making the film includes the step of blending the linear low density polyethylene resin and the anti-blocking agent in the proportions and ranges desired as discussed above. The resins are usually purchased from a supplier in pellet form and can be blended in any one of a number of commercially available blenders as is well known in the art. The anti-blocking agent is generally provided in particulate form for example as a powder.

The linear low density polyethylene resin and anti-blocking agent, as a blend, are then fed into the hoppers of two extruders which feed a coextrusion die. The blend is extruded at temperatures of from about 370° F. to about 400° F. The ethylene vinyl alcohol copolymer resin, the polyamide resin, and the adhesive resin are likewise fed into respective extruders which feed the coextrusion die. The ethylene vinyl alcohol copolymer resin is extruded at a temperature of from about 410° F. to about 430° F. The polyamide resin is extruded at a temperature of from about 445° F. to about 490° F. The adhesive polymeric material is extruded at a temperature of from about 420° F. to about 435° F. For the preferred seven layer film having the two identical surface layers, two identical adhesive layers and two identical intermediate layers, and the core layer of ethylene vinyl alcohol copolymer, at least five extruders need to be employed. Additional extruders may be employed if a film having nonidentical adhesive or intermediate layers is desired. The materials are coextruded as a relatively thick tube or "tape" which has an initial diameter dependent upon the diameter of the coextrusion die. Circular coextrusion dies are well known to those in the art and can be purchased from a number of manufacturers. In addition to tubular coextrusion, slot dies could be used to coextrude the material in sheet form.

EXAMPLE 1

A sample film was prepared by blending 90% of LLDPE (Dowlex 2035), and 10% EPE-8160 anti-blocking agent. This outside blend layer was coextruded with a core layer containing EVAL F, and intermediate layers of Capron 8207 F, a nylon 6 resin available from Allied Corp. Plexar 3196 a linear low density polyethylene-based resin was used as an adhesive material.

The film exhibited an oxygen transmission rate averaging less than 0.2 cc STP/(24 hours, square meter, atmosphere) at 73° F., 0% RH (ASTM D 3985) at a total film gauge of about 5.15 mils. The film also had a water vapor transmission rate (grams/24 hours, 100 square inches at 100% RH) of about 0.36 at 100° F. (ASTM F 372) at a total film gauge averaging about 5.20 mils. Typical gauge of the barrier (EVOH) layer was 0.57 mils.

EXAMPLE 2

A second sample film was produced substantially as described in Example 1, but with Plexar 2581 in place of the Plexar used in the previous example.

EXAMPLE 3

A nine layer structure was produced substantially as described in Example 1, but having four blend layers of LLDPE and anti-blocking agent instead of only two such layers. The two outer layers of Example 3 were substantially the same as those in previous examples, but about half the thickness. On the interior or film side of each of the two outer layers, an additional layer of a blend of about 85% LLDPE and about 15% of another anti-blocking agent were provided, these third and fourth blend layers having about the same thickness as the two outer layers. The adhesive layers of this third sample film comprised Plexar 3196.

EXAMPLE 4

A fourth sample film was prepared substantially as described in example 1, and comprising nine layers as in Example 3, but with the substitution of Dowlex 2037 for the Dowlex 2035 of the interior third and fourth blend layers of Example 3.

The film of the present invention is preferably not stretch oriented, and therefore preferably a non-shrinkable film, especially in applications such as vertical form-fill-seal packaging. The film is also preferably unirradiated.

Various changes and modifications to the invention can be made by one skilled in the art without departing from the scope of the claims as presented below.

What is claimed is:

1. A method of making a palindromic seven-layer film comprising:
    (a) feeding an ethylene vinyl alcohol copolymer melt through a first extruder to a coextrusion die;
    (b) feeding a polyamide melt through a second extruder to the coextrusion die;
    (c) feeding a melt of an adhesive polymeric material through a third extruder to the coextrusion die;
    (d) feeding a blend of linear low density polyethylene and an anti-blocking agent, as a melt, through fourth and fifth extruders to the coextrusion die;
    (e) extruding the seven-layer film from the coextrusion die;
    (f) cooling the coextruded film;
    (g) collapsing the cooled film; and
    (h) gathering the collapsed film on a take-up means.

2. The method according to claim 1 wherein the ethylene vinyl alcohol copolymer is extruded at a temperature of from about 410° F. to about 430° F.

3. The method according to claim 1 wherein the polyamide is extruded at a temperature of from about 445° F. to about 490° F.

4. The method according to claim 1 wherein the adhesive polymeric material is extruded at a temperature of from about 420° F. to about 435° F.

5. The method according to claim 1 wherein the blend of linear low density polyethylene and anti-blocking agent is extruded at temperatures of from about 370° F. to about 400° F.

* * * * *